US008176940B2

(12) United States Patent
Lehnert

(10) Patent No.: US 8,176,940 B2
(45) Date of Patent: May 15, 2012

(54) PRESSURE ACCUMULATOR, IN PARTICULAR PULSATION DAMPER

(75) Inventor: Markus Lehnert, Rehlingen Slersburg (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 569 days.

(21) Appl. No.: 12/224,040

(22) PCT Filed: Nov. 14, 2006

(86) PCT No.: PCT/EP2006/010885
§ 371 (c)(1), (2), (4) Date: Sep. 22, 2008

(87) PCT Pub. No.: WO2007/098795
PCT Pub. Date: Sep. 7, 2007

(65) Prior Publication Data

US 2010/0307146 A1 Dec. 9, 2010

(30) Foreign Application Priority Data

Feb. 22, 2006 (DE) ........................ 10 2006 008 175

(51) Int. Cl.
*F16L 55/04* (2006.01)
*F02M 47/02* (2006.01)
*F02M 41/16* (2006.01)

(52) U.S. Cl. ............................... 138/31; 138/26; 138/30

(58) Field of Classification Search .................... 239/89, 239/96; 138/26–31; 285/226, 227
See application file for complete search history.

(56) References Cited

U.S. PATENT DOCUMENTS 445,917 A * 2/1891 Worthington ................ 417/210
3,424,202 A * 1/1969 Lincicome ...................... 138/31
4,997,009 A * 3/1991 Niikura et al. .................. 138/30
5,205,326 A * 4/1993 Paley et al. ..................... 138/30

FOREIGN PATENT DOCUMENTS

DE 295 07 077 U1 6/1995
DE 10 2004 004 341 A1 8/2005
JP 50-059811 A 5/1975
JP 54-007615 A 1/1979
JP 02-225802 A 9/1990
JP 2006-194367 A 7/2006
WO WO 2005/073564 A1 8/2005

* cited by examiner

*Primary Examiner* — Jason J Boeckmann
*Assistant Examiner* — Justin Jonaitis
(74) *Attorney, Agent, or Firm* — Roylance, Abrams, Berdo & Goodman, L.L.P.

(57) ABSTRACT

A pressure accumulator, in particular a pulsation damper, has an accumulator housing (1) defining a longitudinal axis (3) and having an inflow opening (15) and an outflow opening (17) for a fluid. A gas space (23) for a working gas and a fluid space (33) are separated from one another inside the accumulator housing (1) in a gas-tight manner by a bellows-like separating member (21). The separating member (21) is connected at one end (25) to a lid (27) forming a fixed termination of the gas space (23) in relation to the housing and at its other end (29) to a piston part (31) axially movable in the accumulator housing (1) and forming a movable termination of the gas space (23). Working movements of the piston part (31) bring about changes in volume of the working spaces adjoining the separating member (21). Inflow opening (15) and outflow opening (17) are respectively provided at the one end and at the other end, opposite one another in the axial direction of the accumulator housing (1). Fluid can then flow through the accumulator housing (1) in its longitudinal direction and in the direction of the working movement of the piston part (31).

19 Claims, 1 Drawing Sheet

PRESSURE ACCUMULATOR, IN PARTICULAR PULSATION DAMPER

FIELD OF THE INVENTION

The invention relates to a pressure accumulator, in particular a pulsation damper, having an accumulator housing defining a longitudinal axis and having an inlet opening and an outlet opening for a fluid. Two working chambers, in particular a gas chamber for the working gas and a fluid chamber, within the accumulator housing are separated fluid-tight, in particular gas-tight from one another by a bellows-like separating element. The separating element is connected on its one end to a cover forming a housing-mounted termination of the gas chamber and on its other end to a piston part axially movable in the accumulator housing and forming a movable termination of the gas chamber. Working movements of the piston part cause volume changes of the working chambers bordering the separating element.

BACKGROUND OF THE INVENTION

Pressure accumulators are known, cf. DE 10 2004 004 341 A1. Preferably such pressure accumulators are used to dampen pressure fluctuations in hydraulic systems to protect measurement and control components, filters and other components integrated in the system against damaging pulsations.

One preferred area of application is the use as pulsation dampers in the injection systems of internal combustion engines, especially large diesel engines aboard ships or in block-type thermal power stations. Pressure fluctuations occur both in the fuel feed system and in the fuel return system. The frequency and intensity of the pulsations are determined by the sequence of injection processes comprising removal of fuel from the system, compression, injection by high pressure injection pumps and re-opening of the connection to the system. For an 8-cylinder, four-stroke engine, this frequency is, for example, 40 Hz at a speed of 600 rpm. Depending on the properties of the system, the fuel delivery pressures and the manner of operation of the high pressure pumps, pressure peaks of more than 50 bar can occur.

Since these fuel systems of conventional design integrate measurement components such as viscosimeters, temperature measuring devices and the like that are sensitive to pressure fluctuations, it is important to eliminate or at least reduce the pressure fluctuations.

SUMMARY OF THE INVENTION

An object of the invention is to provide a pressure accumulator with a compact construction and characterized by especially good damper action.

According to the invention, this object is basically achieved by a pressure accumulator implementing an in-line construction for the inlet opening and the outlet opening, lying along one axis. Compared to the known solutions having a flow deflection block on one end of the accumulator housing on which both fluid ports are located and in which inner deflection surfaces dictate a flow path for the inflowing fluid and outflowing fluid, in the invention the overall length is less and thus the desired construction is compact. The in-line construction also enables simpler and more space-saving installation. When the accumulator housing, for example, has a cylindrical shape, the pressure accumulator after installation looks like an intermediate line piece differing from the base line only in diameter. Since for in-line installation no bending/torsion moments are applied by the pressure accumulator to the line, the number of fasteners may be reduced.

Since there is only one opening on each end of the housing, fluid ports of especially large dimensions are possible. Much larger flow rates can then be implemented than in the prior art. The flow through the accumulator housing in its longitudinal direction leads to the desired improvement of the damping action.

Preferably the separating element is a metal bellows with a plurality of folds or membrane pairs located over one another. The separating element interior it borders the gas chamber between the cover and the piston part. When using this metal bellows, almost no gas losses occur. When using suitable metals, such as stainless steel, no problems due to corrosive fluids such as diesel oil, heavy oil or biofuels arise. Nor are increased fuel temperatures a problem, since the corresponding metallic materials are resistant to temperatures far exceeding 200° C. Weld connections on the metal bellows provide a gas-tight termination without additional seals.

In advantageous embodiments the piston part on its side bordering the fluid chamber has a cavity enlarging the volume of the fluid chamber. The piston part can be made cup-shaped with a circular cylindrical side wall extending into the circularly cylindrical interior of the metal bellows along the inside of its folds with an immersion depth of varied magnitude according to the working movements of the piston part. The enlargement of the volume of the fluid chamber at the same time accompanies a reduction in the volume of the gas chamber. This arrangement yields several advantages. First, the choice of the depth of the "cup" enables matching of the ratios of the volumes of the gas chamber to the fluid chamber according to the respective working conditions. Second, the special advantage arises that the length of the metal bellows even for a preferable small volume of the gas chamber can be selected to be relatively long so that it has a plurality of folds. This structure ensures that the bellows in the execution of alternating movements is in the region of tolerable material stresses so that it can execute a stroke as large as possible with as large a number of repetitions as possible without compromising operating reliability.

Finally, because the piston part extends in a cup-like manner in the interior of the metal bellows, the metal bellows is guided and supported from the inside. The possibilities of angular or lateral deflection are then limited. This structure protects the metal bellows against unfavorable operating states and ensures optimum dynamic behavior.

In one especially simple and economical construction, the accumulator housing is a circularly cylindrical tubular body in which the metal bellows is concentrically held with the formation of an annulus between the inside wall of the tubular body and the outside of the metal bellows. The annulus forms part of the flow path of the fluid between the inlet opening and the outlet opening.

If the inside diameter of the tubular body is selected to be larger than the outside diameter of the metal bellows to such a degree that the inside cross section of the flow path formed by the annulus is greater than or equal to the inside cross section of the inlet opening and outlet opening, fluid flow rates as large as possible can be implemented without significant throttling.

Accordingly, it is advantageous to make the arrangement such that the cover of the metal bellows is fixed on the inside wall of the tubular body by a support structure whose structural elements are designed with respect to minimization of throttling on the flow path between the annulus and adjacent outlet opening. For this purpose the support structure can have a retaining ring fixed on the inside wall of the tubular body with which the cover of the metal bellows is connected by attachment rods extending from the side edge of the cover to the retaining ring. For a correspondingly slender configuration of the retaining ring and fastening rods, the flow resistance is only little.

To limit the working movement of the piston part which draws out the metal bellows, if, for example, there is no fluid system pressure and the gas chamber is prefilled with the working gas, a stop can interact with the piston part.

Analogously to the support structure fixing the cover of the metal bellows, the stop can also be formed by a structure whose structural elements are chosen with respect to minimization of the throttling of the flow path caused by them. For this purpose a retaining ring fixed on the inside wall of the tubular body and at least one fastening rod spanning the interior of the retaining ring can be provided.

The working gas prefilling the working chamber is, for example, nitrogen gas ($N_2$). In addition, the gas chamber can be filled with an additional amount of an alcohol, preferably ethylene glycol. As a result the volume of the gas chamber can be additionally reduced for purposes of precision adjustment.

For a correspondingly sufficient additional amount of alcohol, a protective function arises for the metal bellows. Before the piston part, for example, at an overpressure in the fluid system, strikes the cover of the metal bellows, a protective liquid cushion forms between the piston part and the cover.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure

DETAILED DESCRIPTION OF THE INVENTION

Figure 3:
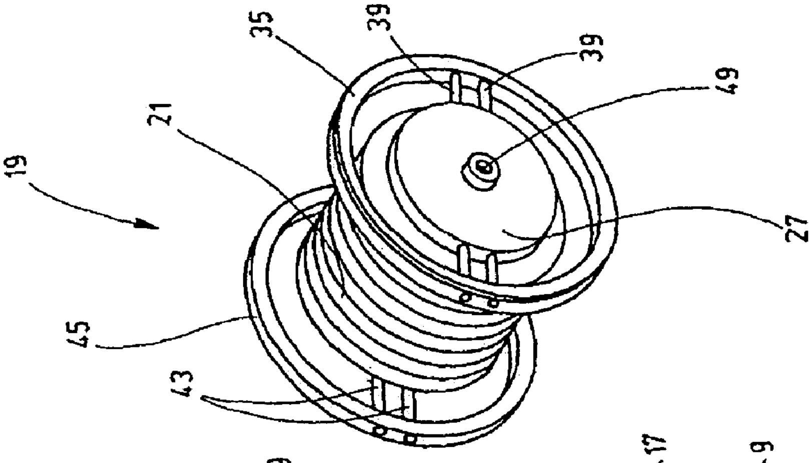
FIG. 3 is a perspective view of the damper unit of FIG. 1, seen essentially in the direction of viewing indicated by arrow III in FIG. 1.

The exemplary embodiment of the pressure accumulator according to the invention can be used as a pulsation damper has as the accumulator housing a circularly cylindrical tubular body 1 with a longitudinal axis 3. The tubular body 1 on its inside wall or surface 5 has narrow annular grooves 7 as a seat for snap rings to be described below and one inside thread 9 on each of its two end regions. With these inside threads 9 an accumulator cover 11 is screwed on each of the two ends. Each cover 11 is made the same and is sealed by a respective sealing element or seal 13 on the tubular body 1. The accumulator inlet cover 11 located at left in FIG. 1 has a central inlet opening 15. The accumulator outlet cover 11 located at right in FIG. 1 has a corresponding outlet opening 17 for the fluid whose pressure fluctuations are to be damped. Inlet opening 15 and outlet opening 17 are coaxial along longitudinal axis 3 for the entire lengths thereof and extend directly from a fluid channel between inside surfaces of covers 11.

Figure 1:
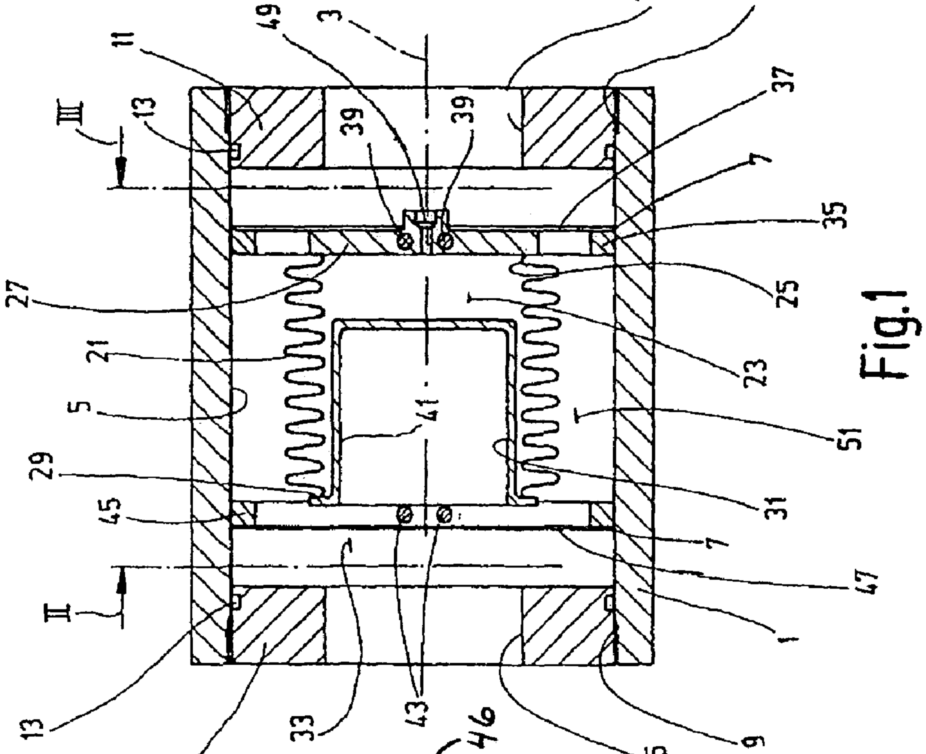
FIG. 1 is a side elevational view in section of a pressure accumulator according to an exemplary embodiment of the invention.
Figure 2:
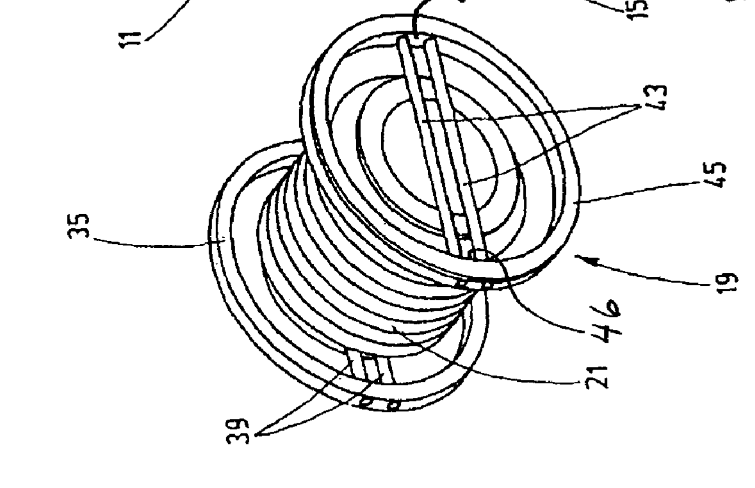
FIG. 2 is a perspective view of only the damper unit provided within the accumulator housing of the embodiment of FIG. 1, seen essentially in the direction indicated by arrow II in FIG. 1.

In an arrangement concentric to the longitudinal axis 3, in the interior of the tubular body 1 there is the damper unit 19 shown separately in FIGS. 2 and 3. An essential component of the damper unit is a metal bellows 21 in the form of a bellows of circularly cylindrical shape shown in FIG. 1 in the fully extended state corresponding to the largest volume of the gas chamber 23 located within the metal bellows 21. Instead of an expansion bellows, a membrane bellows (not shown) could also be used and have appropriately arranged membrane pairs instead of folds located over one another. To form a housing-mounted termination of the gas chamber 23, one end 25 of the metal bellows 21 is welded to a cover 27. On its other end 29, the metal bellows 21 is welded to the piston part 31 forming a movable termination of the gas chamber 23. In the accumulator housing, piston part 31 can execute an axial working movement leading to volume changes of the gas chamber 23 and of the fluid chamber 33 surrounding the damper unit 19.

The cover 27 is fixed by a support structure on the inside wall 5 of the tubular body 1. This support structure has a retaining ring 35 locked by a snap ring 37 sitting in one annular groove 7. The retaining ring 35 in turn is connected to the side edge of the cover 27 by attachment rods 39.

As is apparent from FIG. 1, the piston part 31 has the shape of a cup whose circularly cylindrical side wall 41 extends into the interior of the metal bellows 21. The immersion depth into the interior is dependent on the piston position in the working movement of the piston part 31. As mentioned, the piston part 31 in FIG. 1 has the end position corresponding to the largest volume of the gas chamber 23. The piston part 31 in that end position has its open cup edge adjoining or abutting the one or more rods 43 forming part of the stop. This stop is formed by a similar structure as used as the support structure for the cover 27, i.e., the retaining ring 45 is locked by a snap ring 47 in the annular groove 7. The rods 43 extend from essentially opposite regions 46 of the inside edge of the retaining ring 45, analogously to the fastening rods 39 on the retaining ring 35.

The cover 27 has a central fill port 49 for prefilling the gas chamber 23 with a working gas, specifically $N_2$. An additional amount of an alcohol, preferably ethylene glycol, can also be prefilled through fill port 49 into gas chamber 23.

Since the two accumulator covers 11 have only one opening each, specifically an inlet opening 15 and an outlet opening 17, a large opening cross section can be provided for those openings so that large flow rates can be achieved. So that a large volumetric flow can flow through the accumulator housing without noticeable throttling, the inside diameter of the tubular body 1 and the outside diameter of the metal bellows 21 are chosen such that a sufficiently large annulus 51 is available as part of the flow path of the fluid chamber 33. Accordingly, the components of the support structure for the cover 27 are also chosen such that there is no major obstruction of the flow path, i.e., both the retaining ring 35 and the fastening rods 39 are made slender, as shown in the figures. Flow can then take place around the outer edge of the cover 27 relatively unobstructed. The corresponding characteristics apply to the configuration of the stop for the piston part 31. The slenderly made retaining ring 45 and slender rods 43 do not form a noticeable flow resistance.

Because the accumulator housing is formed by a simple tubular body 1 and because the housing termination takes place by identically made accumulator covers 11, production is especially simple and economical. The damper unit 19 can be prefabricated as a unit, can be inserted as a whole into the tubular body 1 and can be fixed by snap rings 37, 47, making installation especially simple. The damper unit prefabricated as a modular unit includes in particular the actual metal bellows 21 as well as the piston part 31 and the retaining ring 35.

At a corresponding prefilling amount, a protective function exists for the metal bellows 21, i.e., before the piston part 31 with its free front side strikes the facing surface of the cover 27 of the retaining ring 35, a layer of liquid forms between the indicated parts. In this way pressure continuing to rise could be precluded from compressing the metal bellows 21 radially.

In the state prefilled with gas, the piston part 31 is supported on the stop 43 with its fastening rods and the metal bellows 21 is at its maximum extension. In this state, the accumulator definitely can accommodate the internal prefilling pressure of the gas. In all other operating states, the metal bellows 21 is in a mostly pressure-equalized state. Depending on the system pressure and the gas temperature prevailing in it, between the lower and upper extreme points the bellows will be able to dampen or eliminate all pressure fluctuations for which it is designed by taking up or discharging fluid. This working principle then corresponds to that of a classical hydropneumatic pressure accumulator used as a damper.

The stop 43 with its fastening rods is used to support the piston part 31 to the extent the system pressure drops below the prefilling pressure within the metal bellows assembly, formed from components including the metal bellows 21, piston part 31, retaining ring 35 and (gas) filling port. This situation can occur, for example, when the metal bellows accumulator 21 is prefilled with nitrogen. The support of the free front side of the piston part 31 enables free flow through the accumulator even if the system pressure should be less than the prefilling pressure. The piston part 31 cannot block the fluid opening 15 in the cover 11 in any case.

While one embodiment has been chosen to illustrate the invention, it will be understood by those skilled in the art that various changes and modifications can be made therein without departing from the scope of the invention as defined in the appended claims.

What is claimed is:

1. A pressure accumulator, comprising:
an accumulator housing formed by a circularly cylindrical tubular body extending along a longitudinal axis and having an inlet opening and an outlet opening at opposite longitudinal ends of said housing allowing fluid flow through said accumulator housing in an axial direction along said longitudinal axis;
a gas chamber in said accumulator housing;
a fluid chamber in said accumulator housing;
a cover terminating one end of said gas chamber and fixed on an inside surface of said tubular body by a support structure, said support structure including a cover retaining ring fixed on said inside surface of said tubular body and attachment rods connecting and extending between a side edge of said cover and said cover retaining ring;
a piston part movably mounted in said accumulator housing along said longitudinal axis and terminating another end of said gas chamber; and
a bellows separating element separating said gas chamber and said fluid chamber gas and fluid tight and concentrically positioned in said accumulator housing to form an annulus between said inside surface of said tubular body and an outside surface of said separating element through which fluid can flow from said inlet opening to said outlet opening, said support structure minimizing throttling of fluid flow between said annulus and said outlet opening, said separating element connected at one end to said cover and at an opposite end thereof to said piston part, working movements of said piston part causing volume changes in said gas chamber and said fluid chamber bordering said separating element.

2. A pressure accumulator according to claim 1 wherein said separating element is a metal bellows.

3. A pressure accumulator according to claim 1 wherein said separating element, said piston and said cover form a pulsation damper.

4. A pressure accumulator according to claim 1 wherein said separating element has a plurality of folds located over one another and an interior bordering said gas chamber between said cover and said piston part.

5. A pressure accumulator according to claim 1 wherein said separating element has a plurality of membrane pairs located over one another and an interior bordering said gas chamber between said cover and said piston part.

6. A pressure accumulator according to claim 1 wherein said piston part comprises a cavity enlarging a volume of said fluid cavity on a side of said piston part bordering said fluid cavity.

7. A pressure accumulator according to claim 6 wherein
said separating element has a circularly cylindrical interior extending along insides of folds in said separating element; and
said piston part is cup-shaped with a circularly cylindrical side wall extending into said interior of said separating element and with an immersion depth of varied magnitude according to working movements of said piston part.

8. A pressure accumulator according to claim 1 wherein said tubular body has an inside diameter larger than an outside diameter of said separating element such that an inside cross section of a flow path formed by said annulus is at least as great as an inside cross section of each of said inlet opening and said outlet opening.

9. A pressure accumulator according to claim 1 wherein a stop is located in said accumulator housing limiting movement of said piston part in a direction enlarging volumes of said gas chamber and being spaced from said inlet opening.

10. A pressure accumulator according to claim 9 wherein said stop comprises structural elements minimizing throttling caused thereby of a flow path between said inlet opening and said annulus.

11. A pressure accumulator according to claim 10 wherein said structural elements of said stop comprise a stop retaining ring fixed on said inside surface of said tubular body and at least one fastening rod extending between essentially opposite regions of said stop retaining ring.

12. A pressure accumulator according to claim 1 wherein said gas chamber is filled with working gas and an alcohol.

13. A pressure accumulator according to claim 12 wherein said alcohol is ethylene glycol.

14. A pressure accumulator, comprising:
an accumulator housing formed by a tubular body extending along a longitudinal axis and having an inlet opening and an outlet opening at opposite longitudinal ends of said housing allowing fluid flow through said accumulator housing in an axial direction along said longitudinal axis;
a gas chamber in said accumulator housing;
a fluid chamber in said accumulator housing;
a cover terminating one end of said gas chamber and fixed on an inside surface of said tubular body;
a piston part movably mounted in said accumulator housing along said longitudinal axis and terminating another end of said gas chamber;
a bellows separating element separating said gas chamber and said fluid chamber gas and fluid tight and concentrically positioned in said accumulator housing to form an annulus between said inside surface of said tubular body and an outside surface of said separating element through which fluid can flow from said inlet opening to said outlet opening, said separating element connected at one end to said cover and at an opposite end thereof to said piston part, working movements of said piston part causing volume changes in said gas chamber and said fluid chamber bordering said separating element; and a stop located in said accumulator housing limiting movement of said piston part in a direction enlarging volumes of said gas chamber and being spaced from said inlet opening, said stop having structural elements minimizing throttling caused thereby of a flow path between said inlet opening and said annulus, said structural elements of said stop including a stop retaining ring fixed on said inside surface of said tubular body and at least one fastening rod extending between essentially opposite regions of said stop retaining ring.

15. A pressure accumulator, comprising:

an accumulator housing formed by a tubular body extending along a longitudinal axis and having an inlet cover with an inlet opening and an outlet cover with an outlet opening at opposite longitudinal ends of said housing allowing fluid flow through said accumulator housing in an axial direction along said longitudinal axis, said inlet opening and said outlet opening being coaxial along said longitudinal axis for entire lengths thereof and extending directly from a fluid channel defined between inside surfaces of said inlet cover and said outlet cover;

a gas chamber in said accumulator housing;

a fluid chamber in said accumulator housing;

a gas chamber cover terminating one end of said gas chamber and fixed on an inside surface of said tubular body;

a piston part movably mounted in said accumulator housing along said longitudinal axis and terminating another end of said gas chamber; and a bellows separating element separating said gas chamber and said fluid chamber gas and fluid tight and concentrically positioned in said accumulator housing to form an annulus between said inside surface of said tubular body and an outside surface of said separating element through which fluid can flow from said inlet opening to said outlet opening, said separating element connected at one end to said gas chamber cover and at an opposite end thereof to said piston part, working movements of said piston part causing volume changes in said gas chamber and said fluid chamber bordering said separating element; and a cover retaining ring being fixed on said inside surface of said tubular body and being attached to said gas chamber cover by attachment rods connecting and extending between a side edge of said gas chamber cover and said retaining ring.

16. A pressure accumulator according to claim 15 wherein said separating element is a metal bellows.

17. A pressure accumulator according to claim 15 wherein said separating element, said piston and said gas chamber cover form a pulsation damper.

18. A pressure accumulator according to claim 15 wherein said tubular body has an inside diameter larger than an outside diameter of said separating element such that an inside cross section of a flow path formed by said annulus is at least as great as an inside cross section of each of said inlet opening and said outlet opening.

19. A pressure accumulator according to claim 15 wherein a stop is located in said accumulator housing limiting movement of said piston part in a direction enlarging volumes of said gas chamber and being spaced from said inlet opening; and said stop includes a stop retaining ring fixed on said inside surface of said tubular body and at least one fastening rod extending between essentially opposite regions of said stop retaining ring.

* * * * *

UNITED STATES PATENT AND TRADEMARK OFFICE
CERTIFICATE OF CORRECTION

PATENT NO. : 8,176,940 B2
APPLICATION NO. : 12/224040
DATED : May 15, 2012
INVENTOR(S) : Markus Lehnert It is certified that error appears in the above-identified patent and that said Letters Patent is hereby corrected as shown below:

On the title page:

"(73) Assignee: Hydae Technology GmbH" should read

--(73) Assignee: Hydac Technology GmbH--.

Signed and Sealed this
Tenth Day of July, 2012

David J. Kappos
*Director of the United States Patent and Trademark Office*